Dec. 18, 1962         M. H. GROVE         3,069,129
         VALVE CONSTRUCTION HAVING FLUID PRESSURE
                 AND SPRING BIAS SEALS
Filed July 31, 1959                    2 Sheets-Sheet 1
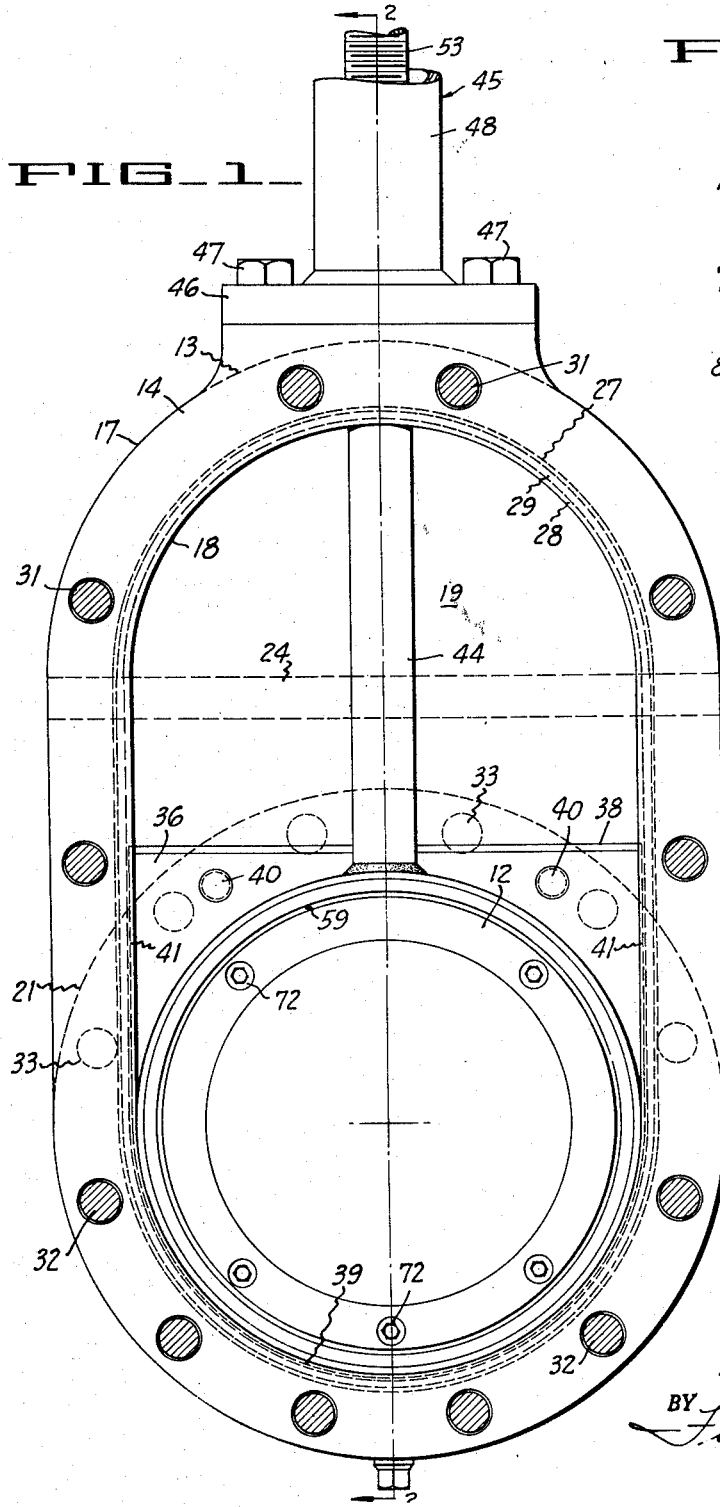
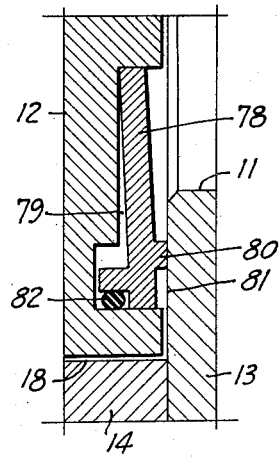
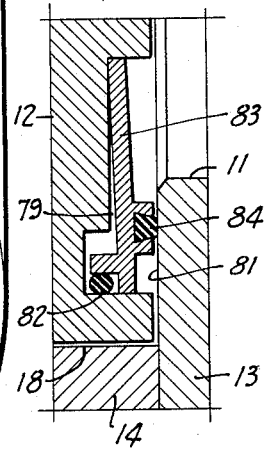
INVENTOR.
Marvin H. Grove
BY
ATTORNEYS Dec. 18, 1962
M. H. GROVE
3,069,129
VALVE CONSTRUCTION HAVING FLUID PRESSURE
AND SPRING BIAS SEALS
Filed July 31, 1959
2 Sheets-Sheet 2
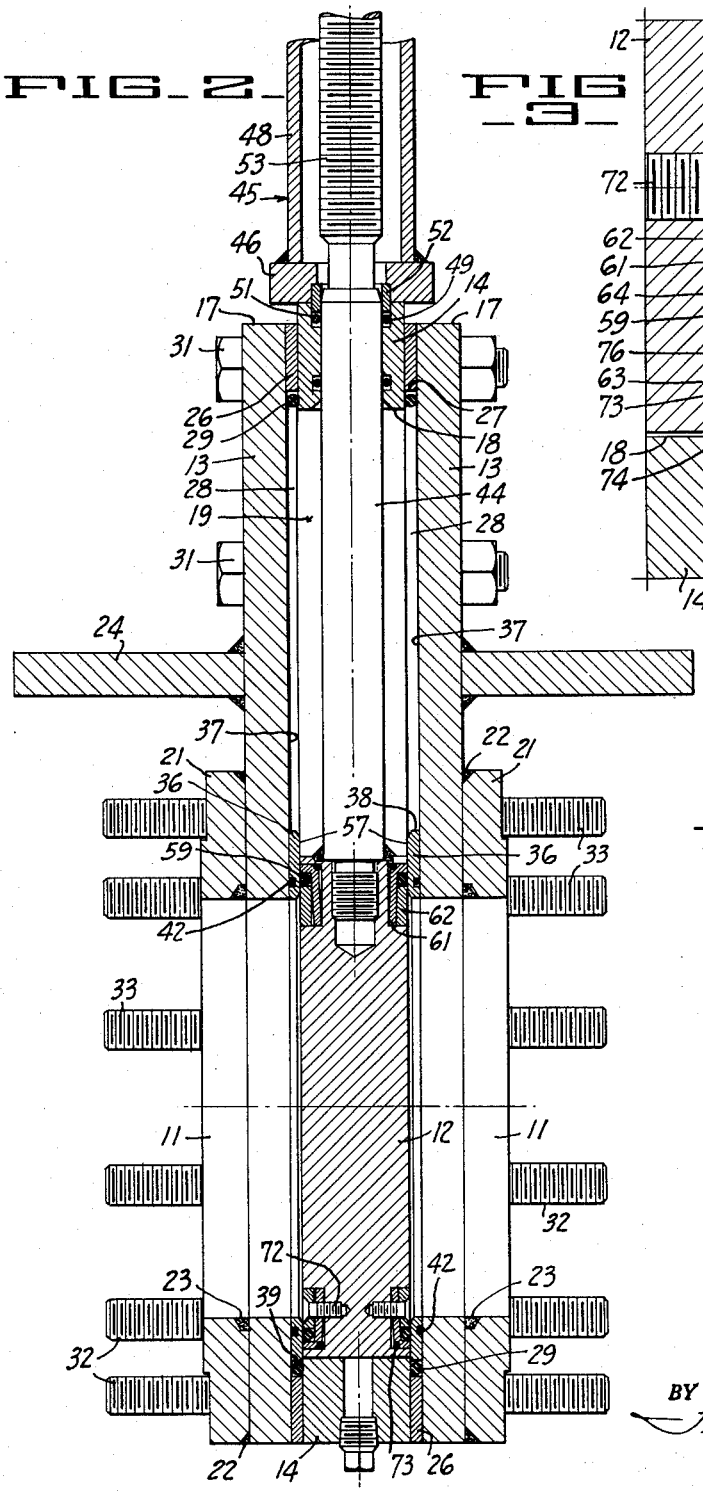
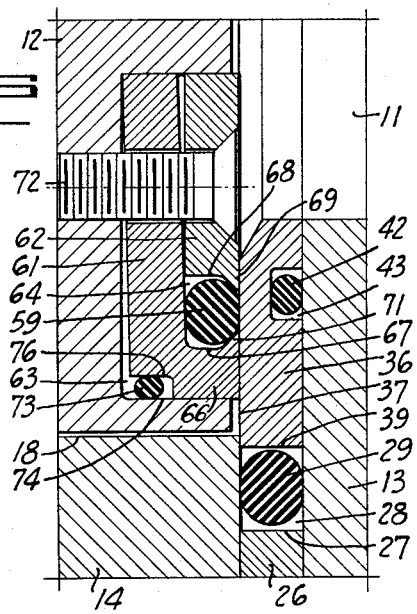
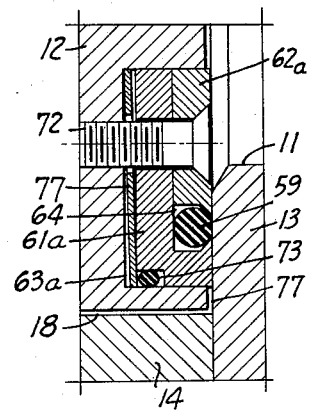
INVENTOR.
Marvin H. Grove
BY
ATTORNEYS 3,069,129
VALVE CONSTRUCTION HAVING FLUID PRESSURE AND SPRING BIAS SEALS
Marvin H. Grove, 340 Hillside Ave., Piedmont, Calif.
Filed July 31, 1959, Ser. No. 830,807
5 Claims. (Cl. 251—175)

This invention relates generally to valves for controlling flow of various fluids, including gases and liquids. More particularly it pertains to valves of the gate type wherein a valve gate is movable between open and closed positions relative to flow passages.

One known type of gate valve has employed a flat plate-like gate, with the opposite sides of the gate cooperating with seating means formed on the body. As disclosed for example in Bryant 2,810,543, fluid tight seals can be provided upon both the upstream and downstream sides of the gate by the use of sealing rings of the resilient type carried by the body. When it is attempted to mount resilient seal rings upon the gate, rather than upon the body, to simplify the overall construction, it is difficult to maintain pressure seals upon both the upstream and downstream sides without resorting to relatively small clearances, which are difficult or impractical to maintain in manufacturing operations.

In general, it is an object of the present invention to provide a relatively simple gate valve construction, which will carry seal rings upon the gate, and which will provide both upstream and downstream pressure retaining seals.

Another object of the invention is to provide a novel valve construction which utilizes resilient seal rings, and which carries such rings in a novel manner on the gate to maintain both upstream and downstream seals.

Additional objects and features of the invention will appear from the following description in which the preferred embodiments have been set forth in detail in conjunction with the accompanying drawings.

Referring to the drawing:

FIGURE 1 is a side elevation in section illustrating a gate valve in accordance with the present invention;

FIGURE 2 is a cross-sectional view taken along the line 2—2 of FIGURE 1;

FIGURE 3 is an enlarged view in section illustrating the construction of the sealing means;

FIGURE 4 is a detail like FIGURE 3 but illustrating another embodiment.

FIGURE 5 is a cross sectional detail similar to FIGURE 3, but showing another embodiment in which a seal is formed between metal to metal surfaces.

FIGURE 6 is a cross sectional detail like FIGURE 5 showing another embodiment in which a resilient insert is employed.

The valve illustrated in the drawing is constructed with a body assembled from several parts, and having features disclosed and claimed in my co-pending application Serial No. 812,064, filed May 8, 1959 now abandoned. However, the invention claimed herein may be used with other types of valve bodies, such as bodies made out of cast or forged metal.

The particular body illustrated is provided with flow passages 11 for connection with associated piping. The valve member 12 is in the form of a flat plate that is movable between open and closed positions with respect to the flow passages. The body is formed from the three plate-like parts 13 and 14, the parts 13 forming the side walls. Each of these parts can be formed of mill rolled steel or like rigid plate material, which may be cut to the configuration desired by suitable means such as an oxyacetylene cutting torch. Each body part 13 is cut to the outer contour line 17, and an opening is cut to provide the passage 11. Body part 14 similarly can be cut from a larger metal plate, both with respect to its outer contour, and also with respect to its inner contour 18 (FIGURE 1) to form the inner body space 19. All of the torch cut surfaces can be suitably smoothed as by grinding or machining.

Hubs may be welded to the side walls to form extended flow passages, or annular members 21 formed of plate material may be attached to the side walls as by weld connections 22 and 23. The side walls may be reinforced by the ribs 24.

Sealing means are provided for forming seals between the body parts. Thus seal ring retainers 26 are interposed between each side face of the intermediate body part 14, and the adjacent side faces of the body parts 13. Each retainer is in the form of a sheet or plate formed of metal, and having its outer edge contoured to the contour line 17 of the valve body. The inner edge 27 of each retainer is contoured to be parallel to the contoured line 18 of the intermediate body part 14, but is spaced outwardly to thereby form the seal ring retaining recess 28. A suitable seal ring 29 is disposed within each such recess, as for example, a seal ring of the resilient O-ring type.

The body parts, together with the seal retainers 26, are clamped together by the bolts 31 and the stud bolts 32. The stud bolts 32 are of sufficient length to extend through the flanges of associated pipe couplings. Threaded openings 33 are provided in the annular members 21, and serve to receive studs of sufficient length to extend through the associated pipe flanges.

The gate 12 is preferably formed of steel or metal plate, and has a thickness corresponding substantially to the thickness of the intermediate body part 14.

Liner means is shown for forming valve working surfaces. Thus metal liners 36 are provided which are formed of metal plates each having a thickness corresponding substantially to that of the retainers 26. They are made of metal or metal alloy capable of forming good valve working surfaces, such as a steel of the stainless type, Monel metal, bronze, or the like. Each liner has an opening coincident with the corresponding flow passage 11 and it extends over the corresponding inner surface 37 of the associated outer body part. It can be contoured in the manner shown in FIGURE 1. Thus the edge 38 extends straight across the interior of the body. The edge 39, together with the adjoining edges 41 are contoured to be parallel to the inner contour line 18 of the intermediate body part 14. Each liner is dimensioned whereby an edge margin corresponding to the edges 39 and 41, is interposed between the body parts 13 and 14. This serves, together with locating members 40, to retain each liner against movement relative to the body.

Sealing means is provided for preventing leakage between each liner and the corresponding inner surface 37. Such sealing means can consist of seal rings 42 of the resilient O-ring type, accommodated within the circular accommodating recesses 43.

Various types of operating means can be provided for moving the gate between closed and open positions. The operating means illustrated can consist of a stem 44 which has its inner end attached to the gate, and which extends through the interior of the body through the bonnet 45. The bonnet may consist of a plate 46, attached to the body part 14 as by means of bolts or studs 47, and which serves to mount the tubular yoke 48. In place of a conventional packing gland, a seal ring 49 of the resilient O-ring type surrounds the stem and is held in the recess 51 by collar 52. The interior threaded portion 53 of the stem is engaged by suitable means (not shown) such as a nut to which a hand wheel or other operating member is applied.

Fluid tight seals are formed between the gate and the body on both the upstream and downstream sides of the valve. The sealing means illustrated consists of a pair of seal rings 59, which in FIGURES 2–3 are of the resilient O-ring type. Such rings can be formed of synthetic rubber such as Hycar or neoprene, or from an elastomer like Teflon, Kel-F, or nylon. The mounting means for each seal ring 59 includes the superimposed members 61 and 62, which are flat ring-like or annular members formed of suitable metal. Members 61 and 62 are loosely fitted within the annular recess 63 formed in the corresponding side of the gate. These annular members are proportioned to form a recess 64, dimensioned to accommodate the seal ring 59. Thus the outer peripheral edge of the member 61 is provided with the annular rim or flange 66, which has an inner peripheral surface 67 that defines the inner periphery of the recess 64. The outer edge of the annular member 62 is formed whereby its outer peripheral surface 68 defines the inner wall of the recess 64. Also, it is desirable for these parts to provide annular lips 69 and 71, which are annular and concentric, and which serve as mechanical means tending to retain the seal ring 59 in place. Assuming the use of a seal ring of the resilient O-ring type, the radial spacing between surfaces 67 and 68 is somewhat greater than the normal diameter of the O-ring.

Spring means is incorporated in conjunction with the mounting means to yieldably urge the seal ring 59 and its mounting means against the valve working surfaces 57. In the embodiment of FIGURE 3, such means is provided by the annular member 61, which is made in the form of a Belleville washer, from metal having considerable spring. The dimensioning is such that with the gate fitted between the valve working surfaces 57, but without fluid pressure being applied to either one of the flow passages, both seal rings 59 are yieldably urged (by the Belleville effect) into sealing contact with the valve working surfaces. At the same time, a small clearance will exist between each side of the gate and the adjacent valve working surface. When fluid pressure is applied to one side of the gate, it is moved and pressed against the downstream valve working surface 57, with such movement being accommodated by the spring of the downstream member 61. The member 61 on the upstream side of the gate springs outwardly a corresponding amount, thus maintaining the seal ring 59 on the upstream side pressed into sealing contact with the corresponding valve working surface 57.

It is desirable to provide means to prevent dislodgement of the members 61 and 62 from the recesses 63. Thus the members 61 and 62 are shown provided with registering openings, which accommodate the retaining screws 72. These screws do not tightly clamp the members 61 and 62 against the bottom of each recess 63, but on the contrary are set whereby sufficient movement is permitted members 61 and 62 to accommodate the different operating conditions.

Assuming closed position of the valve as shown in FIGURE 2, the seal rings 59 both engage the valve working surfaces 57 in annular regions which surround the body flow passages. Additional sealing means 73, preferably of the resilient O-ring type, serves to establish a seal between each of the members 61, and the outer peripheral surface 74 of the associated gate recess 63. The outer peripheral margin of the member 61 is provided with a recess 76, to accommodate the seal ring 73 of the resilient O-ring type. Ring 73 establishes a seal between the mounting means and the gate in a region which encompasses an area considerably greater than the area encompassed by the seal ring 59. Therefore, the differential area, or the difference between said encompassed areas, provides a fluid pressure area which is exposed to the pressure in the corresponding flow passage of the valve. Thus referring to FIGURE 3, this fluid pressure area is substantially that annular area between the outer defining surface 74 of each recess 63, and the mean effective diameter of the seal ring 59. Pressure communication with the corresponding flow passage, for transmitting fluid pressure against such area, is by virtue of the loose fit between members 61 and 62, and the recess 63.

Operation of the valve described above is as follows: As previously stated, the spring provided by the dished spring members 61 serves to yieldably urge the seal rings 59 and their mountings against the valve working surfaces 57, for all operating conditions. Assuming application of pressure to the left hand flow passage 11 as viewed in FIGURE 2, the gate is urged to the right into abutment with the downstream valve working surface 57. On the upstream side, the spring member 61 causes the seal ring 59 to be urged into sealing contact with the upstream valve working surface 57, and at the same time fluid pressure in the upstream passage acts upon the fluid pressure area formed by virtue of the different diameters of the seal ring 59 and O-ring 73, to likewise urge the seal ring and the accompanying mounting parts against the valve working surface 57. On the downstream side, application of downstream fluid pressure to the pressure area just described has no appreciable effect because the thrust of the pressure against the gate is of sufficient magnitude to hold the gate against the downstream valve working surface 57. If the application of fluid pressure is reversed, or in other words, if the right hand fluid passage 11 is made the upstream side, the operation is the same except that in this instance the right hand sealing means is responsive to the upstream fluid pressure to maintain a seal between the gate and the body. Any pressure trapped in the body vents to a flow passage where a substantially lower pressure exists, because under such conditions a pressure differential acts upon the seal ring mounting to break sealing contact with the valve working surface.

It will be evident from the foregoing that my valve is of relatively simple construction. It provides adequate sealing means on the gate, but makes possible fluid tight seals upon both the upstream and downstream sides.

The construction just described provides for controlled venting of the inner bottom corners of the recesses 64 to the corresponding flow passages. By reference to FIGURE 3, it is evident that this is by virtue of the loose fit of each member 62 in its recess 63, and its unsealed face to face contact with the adjacent side face of the members 61. Such pressure equalization or venting of the O-ring accommodating recesses aids in preventing dislodgement of the O-rings 59 from their accommodating recesses, for the reasons explained in Patent 2,810,543, and 2,713,989.

FIGURE 4 illustrates another embodiment in which an element separate from the members 61 and 62, provides spring means. Thus in this instance members 61a and 62a correspond to the members 61 and 62, but the member 61 is not constructed to give Belleville action. An additional member 77, in the form of a spring Belleville washer, is interposed between the bottom of the gate recess 63a and the member 61a. This Belleville washer serves to urge the members 61a and 62b outwardly with respect to the gate and to urge the seal ring 59 into sealing contact with the adjacent valve working surface 77 of the body. As indicated in this figure, the valve working surface in this instance is indicated as being integral with the body, instead of upon a separate liner.

As illustrated in FIGURE 5, the construction may be such as to provide metal to metal sealing surfaces, instead of employing a resilient seal ring. Thus in this instance an annular member 78 is loosely disposed within the gate recess 79, and is constructed to provide a Belleville-like action as previously described for the member 61. A rib 80 upon the member 78 provides an annular sealing surface for engagement with the corresponding valve working surface 81 on the body. Sealing means 82 of the O-ring type corresponds to the sealing means 73 of FIGURE 3.

It will be evident that the arrangement of FIGURE 5 functions in substantially the same manner as FIGURES 1 to 4. The upstream fluid pressure acts in the same manner to cause maintenance of a seal upon the upstream side of the valve.

Instead of a resilient seal ring of the O-ring type, it is possible to use a molded-in resilient seal ring. Thus as shown in FIGURE 6, the construction is similar to that of FIGURE 5, with the member 83 corresponding to the member 78. A resilient seal ring 84 is molded into the member 83 to form a soft or resilient sealing surface, for engagement with the valve working surface 81.

In all of the above described embodiments it is desirable for the line pressure on the closed gate to be taken as thrust on parts carried within the gate recess, rather than on the side surfaces of the gate. Thus in FIGURE 3, when the gate is urged by line pressure toward the right, member 61 bottoms on the bottom surface of the recess, and its portion 66 takes the thrust against the body, whereby a slight clearance exists between the side surface of the gate and the cooperating body surface. The other embodiments can be similarly proportioned. For example, in FIGURE 4, the thrust may be taken by member 61a and the spring member 77, and in FIGURE 5, by member 78.

The clearances provided between the gate and the body may vary according to the size of the valve and various conditions for which it is designed. Close tolerances, for the embodiments of FIGURES 3, 4 and 6, may prevent relieving of trapped body pressure as previously described.

I claim:

1. In a valve construction, a body having aligned flow passages and sealing means providing opposed flat parallel valve working surfaces surrounding the flow passages, a plate-like valve gate within the body having flat side faces and movable between open and closed positions relative to said passages, said gate having annular recesses in its side faces, said recesses being faced outwardly of the gate toward the corresponding valve working surfaces, and means movably carried by the valve gate within said recesses forming both upstream and downstream seals between the sides of the valve gate and said valve working surfaces, each of said last means comprising an innermost first and an outermost second annular member disposed one upon another, a seal ring of resilient material for contacting the associated valve working surfaces to establish a fluid seal, said annular members being formed to provide a recess for accommodating said seal ring, and sealing means of the O-ring type forming a seal between one of said annular members and the gate in a region which encompasses a greater area than the area encompassed by the resilient seal ring.

2. A valve construction as in claim 1 in which the innermost first one of said annular members is formed to urge the associated seal ring against the associated valve working surface by Belleville action.

3. A valve as in claim 1 in which a supplemental spring means is provided to urge the associated seal ring and its mounting means against the associated valve working surface.

4. A valve as in claim 1 in which the last named sealing means has sealing contact with the outer peripheral defining surface of the corresponding gate recess.

5. In a valve construction, a body having aligned flow passages and seating means providing opposed parallel flat valve working surfaces surrounding the flow passages, a plate-like valve gate within the body having flat side faces and movable between open and closed positions relative to said passages, and means carried by the valve gate for forming an upstream seal between one side of the valve gate and the valve working surface facing said one side of the valve gate, said gate being formed with an annular first recess, said first recess having an outer peripheral defining surface, said last means comprising annular metal mounting means movable disposed within said first recess and having a second annular recess facing said valve working surface, said second recess being formed by radially spaced inner and outer peripheral defining surfaces on said mounting means, a resilient first seal ring in said second recess for effecting sealing contact between said mounting means and the corresponding valve working surface and a separate resilient second seal ring of the O-ring type for effecting sealing contact between the outer periphery of said mounting means and said first recess outer peripheral defining surface in an annular region encompassing a greater area than the area encompassed by said first seal ring, circumferentially spaced means extending through said metal mounting means in regions located inside both said seal rings for loosely retaining said mounting means within said first recess and metal spring means for urging said mounting means against said corresponding valve working surface, whereby an effective fluid pressure area is presented by said mounting means to the fluid pressure in the associated upstream fluid passage.

References Cited in the file of this patent

UNITED STATES PATENTS

| 2,548,128 | Snyder | Apr. 10, 1951 |
| 2,628,060 | Parker | Feb. 10, 1953 |
| 2,628,809 | Mikeska | Feb. 17, 1953 |
| 2,970,805 | Pool | Feb. 7, 1961 |

FOREIGN PATENTS

| 743,213 | Great Britain | Jan. 11, 1956 |